Oct. 19, 1937.  R. J. STEVENS  2,096,473

SYSTEM OF CONTROL FOR ELECTRICALLY OPERATED ELEVATORS

Filed April 29, 1936

WITNESSES:

INVENTOR
Ronald J. Stevens
BY
ATTORNEY

Patented Oct. 19, 1937

2,096,473

UNITED STATES PATENT OFFICE 2,096,473

SYSTEM OF CONTROL FOR ELECTRICALLY OPERATED ELEVATORS

Ronald John Stevens, Duston, England, assignor to The Express Lift Company Limited, London, England Application April 29, 1936, Serial No. 76,889
In Great Britain May 8, 1935

7 Claims. (Cl. 172—152)

This invention relates to control systems for electrically operated lifts or elevator cars, and has for its object the provision of means whereby the deceleration-time curve is rendered substantially independent of load.

In certain systems of elevator control, when the car is to be stopped, the driving motor is disconnected and deceleration is produced or assisted by employing an eddy current brake the energization of which after reaching the steady state is constant. By this means, the deceleration produced by the said brake varies with the load on the car, whether opposing or helping the motion of the car; and such variation, unless corrected, causes poor levelling when the car reaches the floor at which it is required to stop. It is, however, known to compensate in some manner for the load on the car by employing devices which control the driving motor.

According to the present invention, in a control system for electrically operated elevators comprising eddy current braking means adapted to control the deceleration of the car, the energization of the eddy current brake during deceleration is controlled in dependence on the load on the car in such manner that the deceleration-time curve for the car is rendered substantially independent of load.

Preferably, the degree of energization of the eddy current brake during deceleration is controlled by means responsive to a current flow to the motor, varying in dependence on the load on the car.

In one embodiment of the invention, a three phase induction motor is employed to drive the car, the said motor having a wound armature. During acceleration, resistance is removed from the rotor circuit causing increase in speed of the motor. During deceleration, however, a fixed value of resistance is inserted in the rotor circuit. If the load in the car is now such as to oppose the motion of the car, a relatively large current still flows in the stator circuit. If, on the other hand, the car load assists the motor, the current in the stator circuit becomes small. At the same time, as resistance is inserted in the rotor circuit of the driving motor, an eddy current brake is also made effective the magnets of which are energized via a metal rectifier from one of the phases of the supply. This brake if energized to a constant degree would not reduce the speed of the car to the same extent during each deceleration, owing to the varying load in the car. A potential derived from an impedance inserted in one of the phase leads of the stator is applied to the grid of a space discharge device with an anode, a cathode and a control grid, the anode circuit of this device passing through a further coil or coils on the eddy current brake and being completed across one of the phases of the supply or a suitable source of current. By this means, the constant energization of the coils of the eddy current brake is modified to an extent dependent on the load so that the deceleration-time curve of the car is made substantially constant and independent of the load.

In a modification, a current transformer is inserted in series with one of the leads to the stator of the driving motor, the output of the transformer being connected, after rectification, direct to the auxiliary coil of the eddy current brake. This avoids the use of a space discharge device.

For a better understanding of the invention, reference may be had to the accompanying drawing in which.

Figures 1, 2:
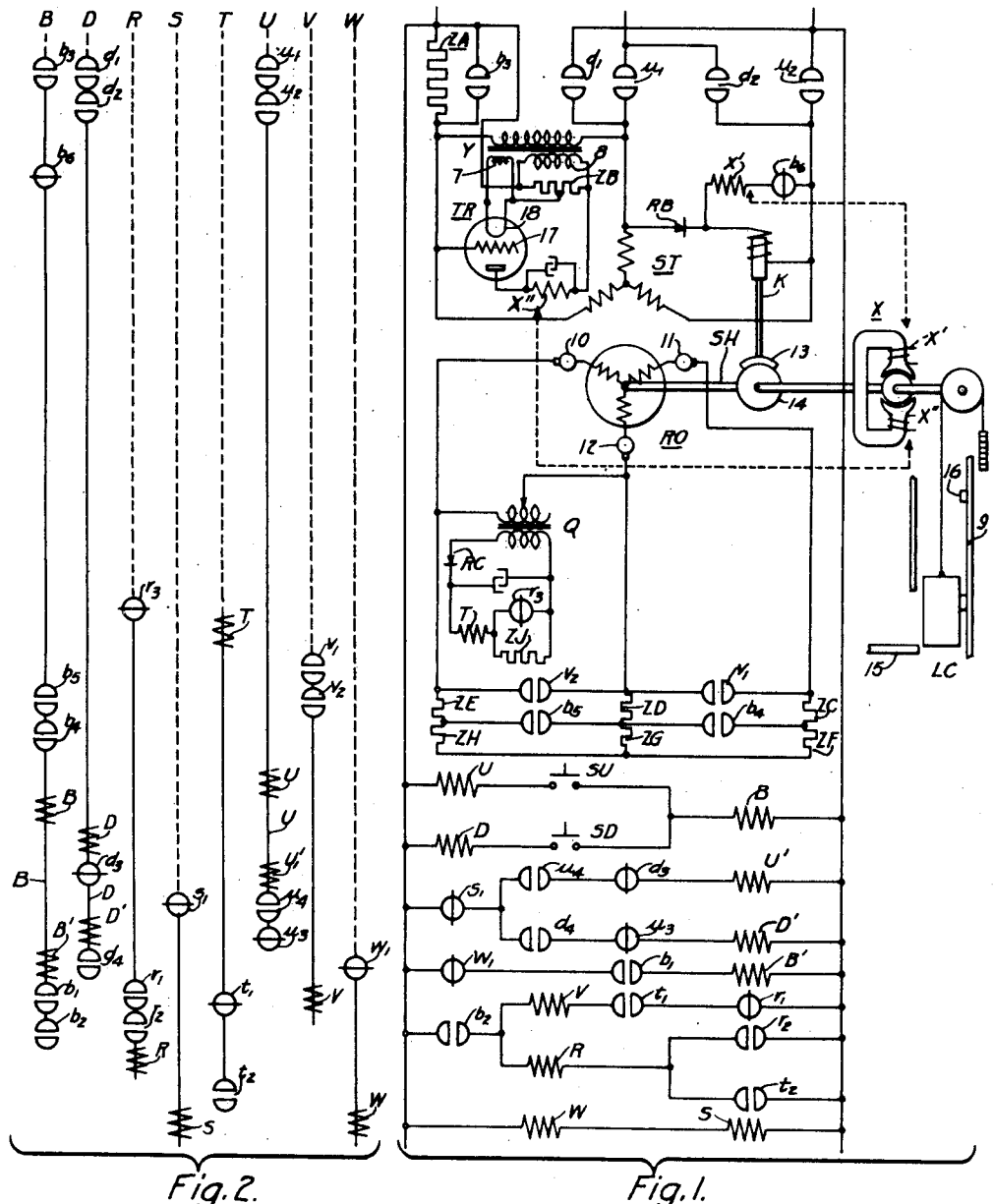
Figure 1 is a diagrammatic representation of a lift or elevator system embodying my invention, with the circuits therefor drawn in what is known as the "straight line" style.
Fig. 2 is a diagrammatic representation of the relays and switches in Fig. 1.

The illustration of the relays given in Fig. 2 shows them with their coils and contact members disposed in horizontal alinement with their positions in the straight line circuits of Fig. 1 so that the position of the coil and the contact members of any relay may be readily determined.

In the drawing, referring now to Fig. 1, the circuits shown are suitable for use in connection with a hand-started automatically-stopped car LC driven from a three-phase supply. This supply is connected to the stator ST via suitable start contacts, and the rotor RO which in practice is mounted on a shaft SH, is provided with slip rings 10, 11 and 12 and starting resistances ZC, ZD and ZE. The eddy current brake X, which includes a constant ampere turn coil X' and a variable ampere turn coil X'', is operated in a manner to be described later, and the car is stopped at a particular floor by a friction brake K.

It is proposed to explain the operation of the circuit by dealing with an assumed operation. To initiate the movement, one of the keys SU or SD is closed. These keys should be so interlocked in any well known manner that it will be impossible to close both simultaneously. Assuming that the key SU is closed, a circuit is completed through the coils of relays B and U which operate in series.

$u_1$ and $u_2$ close circuits from the three-phase supply to the motor stator ST.

$u_3$ prevents false operation of relay D.

$u_4$ closes the locking circuit from another coil of relay U via contact $d_3$ to positive on contact of relay S.

$b_1$ locks relay B operated on its second winding to the contact of relay W.

$b_2$ prepares a locking path for relays R and V.

$b_3$ short-circuits the impedance ZA.

$b_4$ and $b_5$ short circuit resistances ZF, ZG and ZH, which are used later during deceleration.

$b_6$ opens the circuit of one of the eddy brake coils K.

Closure of contacts $u_1$ and $u_2$ also applies voltage through the rectifier RB to the coil of brake K, removing the brake-shoe 13 from its sheave 14 and allowing the car to move away from the floor 15 at which it is positioned. Currents of starting magnitude flow in the coils of the rotor RO, these currents passing through the starting resistances ZC, ZD, and ZE.

A potential is also set up across the primary of the transformer Q, the turns of which are variable for adjustment purposes. This potential produces a current through the rectifier RC, coil of relay T and contact $r_3$ in series, thus operating relay T.

$t_2$ operates relay R to positive on contact $b_2$.

$t_1$ locks out relay V.

$r_1$ prepares to operate relay V when relay T releases later.

$r_2$ locks relay R operated.

$r_3$ removes a short circuit on resistance ZJ reducing the current in relay T.

As the car gains speed, the potential across the primary of the transformer Q becomes less owing to the smaller rotor slip. This reduces the potential across relay T until the current through this relay is insufficient to maintain it operated, whereon it releases. Contact $t_1$ now operates relay V through contact $r_1$ to positive on $b_2$, and the contacts $v_1$ and $v_2$ short circuit the starting resistances ZC, ZD, ZE, enabling the rotor to accelerate to full speed.

The car continues to move in the required direction until at some distance ahead of the floor at which stoppage is required. At this point the key SU is released, though as both relays B and U are locked operated, nothing further happens for the moment.

At a predetermined distance ahead of each floor a zoning plate 16 is fixed in the elevator shaft 9, this plate cooperating with the relay W, which is of the magnetic inductor type. This relay operates momentarily while the car is passing the plate, the contacts of relay W breaking the locking circuit of relay B and releasing it.

$b_1$ prevents re-operation of relay B when the contact of W recloses.

$b_2$ releases relays R and V.

$b_3$ inserts the impedance ZA in the grid 17 circuit of the triode TR (see later).

$b_4$ and $b_5$ remove short circuits on the impedances ZF, ZG and ZH.

$b_6$ closes the circuit of one of the eddy brake coils.

$v_1$ and $v_2$ remove short circuits on the starting resistances ZC, ZD and ZE.

Owing to the impedance inserted in the rotor circuit the stator currents are now limited in value and the car commences to slow down. The stator currents are approximately proportional to the load of the car; thus if the load is helping then the currents in the stator are small, while conversely if the load is hindering the stator currents will be of considerable magnitude. These currents in passing through the impedance ZA, produce on the grid 17 of the triode TR a potential which is proportional to the load of the car. The triode filament 18 is supplied with current from a secondary winding 7 of the transformer Y the primary of which is excited by the closure of any of the starting contacts. Another secondary winding 8 of the transformer also applies current to the potentiometer ZB. The relative phases of these potentials is such that the triode TR is normally biased to its cut-off point and acts as an anode bend rectifier.

The anode circuit of the triode includes one winding X'' of the eddy current brake X, and is supplied with potential in parallel with the potentiometer ZB. Normally when the contact $b_3$ is closed, substantially no current flows in the anode circuit and hence brake X is not effective during the running of the car. When, however, relay B releases, potentials developed across the impedance ZA are applied to the grid of the triode allowing a current of a magnitude proportional to the stator current to flow through the coil X'' of the eddy current brake X. A slowing effect proportional to the load in the car is thus produced, and the car is brought gradually to a slow speed while approaching the desired floor. When this floor is reached, a further inductor relay S operates and its contact S1 opens the circuit of relay U allowing it to release. Contacts $u_1$ and $u_2$ de-energize the stator and transformer Y, the current ceases to flow in the circuit of the brake magnet K so that the friction brake is re-applied to the shaft SH bringing the motor and car LC to a standstill.

As the braking effect is proportional to the load in the lift, it will be seen that a considerable measure of compensation is applied to the car motor during the slow-down. This enables the car to stop with considerable accuracy at the correct floor level without the necessity for "inching" up or down. The amount of compensation for load derivable from the circuit shown in Figure 2 is large, owing to the magnification factor of the triode TR. Even greater compensation can be obtained if the impedance ZA is made in the form of a current transformer having a step up ratio working into a fairly high impedance, since the grid itself is of too high an impedance for direct connection to the secondary of a current transformer.

The circuit, however, possesses certain disadvantages, a notable one being that of cost. The circuit shown in Figure 3 is considerably cheaper although the amount of compensation obtainable is less than that for Figure 2.

Figure 3:
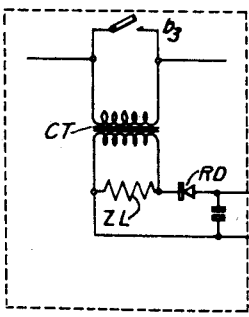
Fig. 3 is a diagrammatic representation of a modified form of the controlling means for the eddy current brake embodied in Fig. 1.

Figure 3 illustrates a current transformer CT which may be inserted in one of the phase leads of the stator ST; for example in place of the impedance ZA. The secondary of the transformer is connected to a limiting impedance ZL and via a rectifier RD to one coil of the eddy current brake X. When the car is stationary, or when running with relay B operated and $b_3$ closed, no current is applied from the transformer to the eddy current brake, but during slow-down, contact $b_3$ opens and thereby causes induction to take place from the primary, and the secondary of the rectifier RD energizes the magnet of the eddy current brake with direct current of a magnitude proportional to the stator current and hence to the load on the car.

Although the invention has been described in connection with a manually controlled car, it should be understood that it may easily be applied to an automatically started or stopped car such as one operating on the so-called "collector" principle, the only difference being that necessary to replace the hand operated keys SU and DU with call storage and floor selecting relays and/or switches of the known type. Such modifications are, however, obvious to those skilled in the art and it is to be understood that the scope of the invention is such as to include obvious modifications of this nature.

I claim as my invention:

1. In an elevator system provided with a car, a motor for operating the car, an eddy current braking means for controlling the deceleration of the car, means for connecting the brake to a source of electric energy, and means responsive to the load of the car for controlling the energy supplied to the brake in accordance with the load of the car to render the deceleration time curve substantially independent of the load.

2. In an elevator system provided with a car, a motor for operating the car, means for connecting the motor to a supply of energy, an eddy current brake for controlling the deceleration of the car, and means responsive to the amount of current taken by the motor during deceleration of the car for controlling the energization of the eddy current brake in accordance with the load on the car.

3. In an elevator system provided with a car, a motor for operating the car, a circuit for connecting the motor to a supply of electrical energy, an eddy current brake for controlling the deceleration of the car, an impedance of a fixed value, means for inserting said impedance in the motor circuit during deceleration, a second fixed impedance, means for inserting said second impedance in the motor circuit, and means responsive to the potential taken by the motor through said second impedance for controlling the degree of energization of the eddy current brake in accordance with the load on the car.

4. In an elevator system provided with a car, an alternating current motor comprising a stator and a wound rotor, a circuit for the motor, a fixed impedance and means for inserting it in the rotor circuit during deceleration of the motor, a second impedance and means for inserting it in one part of the circuit for the stator, an eddy current brake for controlling the deceleration of the car, and a triode responsive to the potential developed across the said second impedance during deceleration for controlling the energization of the eddy current brake in accordance with the load on the car.

5. In an elevator system provided with a car, an alternating current motor comprising a stator and a wound rotor, a circuit for connecting the stator to a source of electric energy, a fixed impedance and means for inserting it in the rotor circuit during deceleration, a second impedance and means for inserting it in one part of the circuit for the stator during deceleration of the motor, an eddy current brake for controlling the deceleration of the car, a triode comprising a grid, a filament and an anode, means for connecting the grid to apply thereto the potential developed across said second impedance during deceleration, and means responsive to the potential developed in the anode by the action of the grid for controlling the energization of the eddy current brake in accordance with the load on the car.

6. In an elevator system provided with a car, a motor for operating the car, a circuit for connecting the motor to a source of electric energy, means for controlling the motor to start, decelerate and stop the car, an eddy current brake for controlling the deceleration of the car, said eddy current brake being provided with a plurality of energizing coils, means for connecting one of said coils to a constant current source of electric energy during deceleration of the car, and means for connecting another of said coils to a source of electric energy during deceleration and varying the current therefrom to said other coil in accordance with the load on the car.

7. In an elevator system provided with a car, an alternating current motor comprising a stator and a wound rotor, a circuit for connecting the stator to a source of electric energy, control means for starting, decelerating and stopping the car, an eddy current brake for controlling the deceleration of the car, a transformer having a primary winding and a secondary winding, means responsive to operation of the control circuit for connecting the primary winding to the circuit for the stator during deceleration, a rectifier connected to the secondary winding, and means connecting said rectifier to said eddy current brake whereby the energization of the eddy current brake will be controlled in accordance with the load of the car during its deceleration.

RONALD JOHN STEVENS.